Oct. 4, 1960 B. E. MUSTEE 2,954,798
MIXING AND DISTRIBUTION VALVE
Filed Sept. 10, 1954 2 Sheets-Sheet 1

INVENTOR.
Bernard E. Mustee
BY Ray S. Pyle
atty

Oct. 4, 1960    B. E. MUSTEE    2,954,798
MIXING AND DISTRIBUTION VALVE
Filed Sept. 10, 1954    2 Sheets-Sheet 2

INVENTOR.
Bernard E. Mustee
BY Ray S. Pyle
atty

United States Patent Office 2,954,798
Patented Oct. 4, 1960

2,954,798
MIXING AND DISTRIBUTION VALVE

Bernard E. Mustee, Cleveland, Ohio, assignor to E. L. Mustee & Sons, Inc., a corporation of Ohio Filed Sept. 10, 1954, Ser. No. 455,268

1 Claim. (Cl. 137—597)

This invention relates to mixing and distribution valves in general, and relates to laundry and sink mixing valves in particular.

Home laundry rooms generally are provided with a washing machine and a laundry tub of some type, together with other accessory equipment. It is the usual practice to provide water outlets leading directly to the laundry tub, and in the event that the washing machine is of the modern automatic type, separate water lines are located near the washing machine. These separate lines for the washing machine require shut-off valves in order to prevent a constant water pressure on the valves of the washing machine while the machine is not in use.

Separate plumbing and valves are expensive and generally unattractive and quite often the user of the equipment neglects to shut off the valves leading to the washing machine with the result that the machine is damaged and requires service in a relatively short period of time. Usually the reason for not shutting off the valves is that they are not readily accessible and therefore are unhandy and easy to forget.

This invention provides a distribution faucet valve adapted to be located in conjunction with the laundry tub. One set of supply leads from the hot and cold water source to this distribution faucet valve is all that is required for both the washing machine and the tub. The normal control valves used to control the flow and distribution of water into the tub also serves as shut-off valves for an associated automatic washing machine.

Therefore, an object of this invention is to provide a mixing valve faucet with water inlet valves, which valves also serve as shut-off valves for separate unmixed water outlets.

Another object of this invention is to provide a distribution and mixing valve combinaton, wherein separate water chambers are provided with water from separate sources through separate control valves, and still further valve means directing water from the separate chambers through a mixed water outlet or closing the mixed water outlet as desired, and the separate chambers serving as valve controlled header means for controlled separate distribution.

Still another object of this invention is to provide a mixing and distribution faucet means in which hot and cold water valves control the rate and proportion of water feed, but separate valve means are employed to shut off and open the mixed water outlet, and distribution lines are taken from the faucet behind the hot and cold valves in order that the hot and cold valves may serve as shut-off valves for such distribution.

Other objects and a fuller understanding of the invention may be had by referring to the following description and claim, taken in conjunction with the accompanying drawings, in which:

Figure 1:
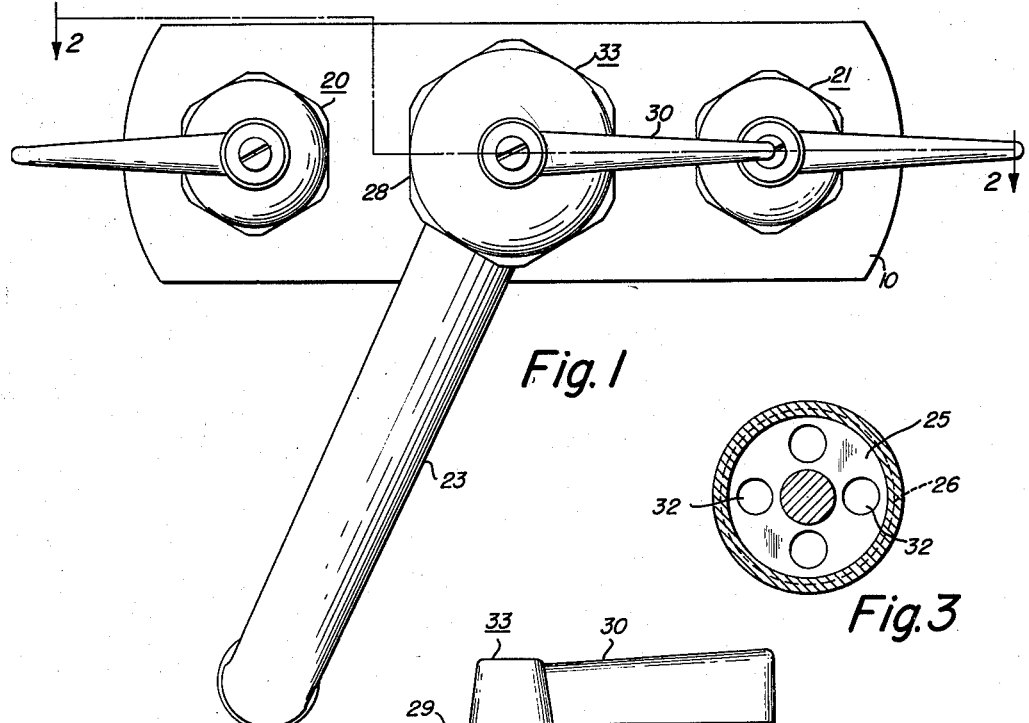
Figure 1 is a top view of one embodiment of the invention.
Figure 3:
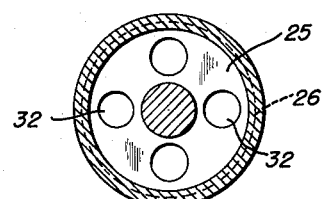
Figure 3 is a sectional view taken along line 3—3 of Figure 2.
Figure 2:
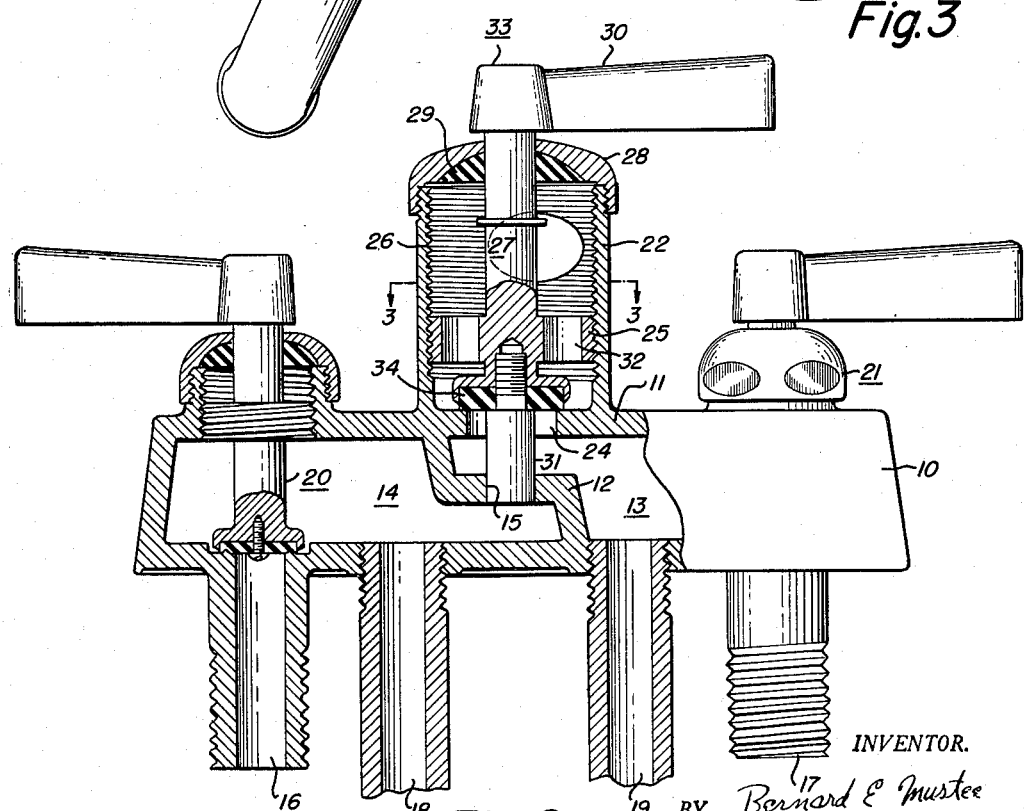
Figure 2 is a partial sectional view from the rear of the distribution faucet valve of Figure 1 taken substantially along the line 2—2 of that figure.

In Figures 1 and 2 of the drawing, a top and sectional view is provided to show the preferred embodiment of this invention. This embodiment incorporates what is believed to be the best combination of means to carry out the basic concept of the invention at the most reasonable cost. The distribution faucet valve illustrated in the Figures 1 and 2 is composed of a chamber body 10 having an outer casing wall 11 and is divided into chambers 13 and 14 by means of a wall 12. An inlet 16 on the left side of the chamber body 10 will normally be attached to a source of hot water and will admit such hot water to the chamber 14 through a valve device 20. The control of hot water into a mixing valve by such valve devices is common and well-known. A similar inlet 17 admits cold water into the chamber 13 through valve device 21. An outlet chamber 22, with an outlet spout 23, is interconnected into chamber 13 by means of an opening 24. Outlet 23 is shown as a fixed spout, but may be a swing spout if desired. If the wall 12 were absent, then the hot and cold water admitted through inlets 16 and 17 would mix and pass through the spout 23 at the rate and in the proportions determined by the positions of valve devices 20 and 21. The wall 12 separates the two chambers. An opening 15 in the wall 12 is provided to allow the water to intermix when opened and to prevent such intermixing when closed.

With the conventional mixing valves there is no control of the outlet of water but rather the control of inlet water determines whether water is to flow from the outlet. According to this invention, a valve device 33 is employed to simultaneously block the opening 24 leading to the chamber 22 and spout 23, and the opening 15 in the wall 12. A guide and drive spider 25 is threadably engaged into threads 26 on the interior surface of the chamber 22 and thereby upon rotation will provide motion toward and away from the openings 24 and 15 much in the manner of the conventional valve device such as the valve device 20. However, openings 32 are provided through the guide spider 25 in order that water may flow through the spider and out into the spout 23. A shaft 27 and handle 33 are provided to permit rotation of the spider 25 from the exterior of the housing 22.

A resilient packing 34 carried below the spider 25 is positioned to cover over and seal off the opening 24, and a plug 31 carried at the end of the shaft 25 beyond the packing 34 is adapted to extend into and plug the opening 15. A thorough water seal between the plug 31 and the opening 15 is not necessary, nor is it provided, because a mere blocking of free movement of the hot and cold water is all that is required and a minor leakage will be of no consequence. It is necessary to provide a thorough water seal of the opening 24 because otherwise there would be a constant dripping from the spout 23.

Outlets 18 and 19 from the chambers 14 and 13 respectively lead directly to suitable fittings to connect into an automatic washing machine. Normally there is no need for valves of any type in the outlets 18 and 19. In fact, it is a provision of this invention that the valve devices 20 and 21 eliminate the need for valves in outlet lines 18 and 19.

Preferably, the distribution faucet valve of this invention will be mounted at the back area of a laundry tub device at the usual location of the water inlet faucets or mixing faucets. On the exterior there is little evidence of any change from the conventional faucet other than the third handle 30. When the handle 30 is rotated to close the openings 24 and 15, the valve devices 21 and 20 may be turned to admit water into chambers 14 and 13. Water will then be available through outlets 18 and 19 to supply an automatic washer. The washer has control valves which will admit water to the washer only when needed. Accordingly, even with the valve devices 20 and 21 in an open position, there is flow of water through chambers 13 and 14 only as required. If water is desired in the laundry tub, the handle 30 is rotated to open the openings 24 and 13. If the valve devices 20 and 21 are already opened to supply the washing machine, the water will immediately begin to flow through the chambers 22 and out of the spout 23. There will be no appreciable effect upon the supply of water through the outlets 18 and 19 except possibly in pressure. The rate of flow from the spout 23 may be controlled by the handle 30 and the proportion of hot to cold water may be controlled by the valve devices 20 and 21 without particular effect upon the supply to a washing machine because the valves of the washing machine will hold until a supply of particular temperature water is obtained whether the water comes rapidly or slowly.

It may be seen from the foregoing description that the improved distribution faucet valve of this invention provides for all valve control to a laundry tub and an automatic washing machine in one convenient location at the usual location of the standard valves of a laundry tub. Accordingly, the supply of water to the washing machine will be properly shut off without the inconvenience of using a second set of valves located in an inconvenient position.

Figure 4:
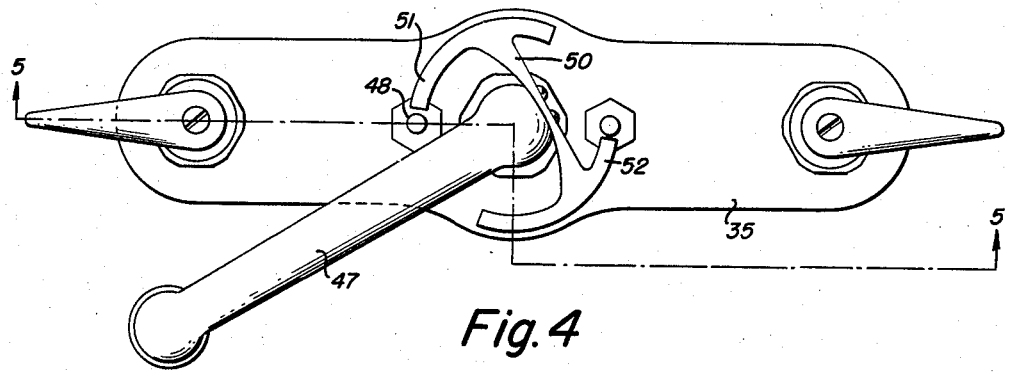
Figure 4 is a top view of another embodiment of the invention.
Figure 5:
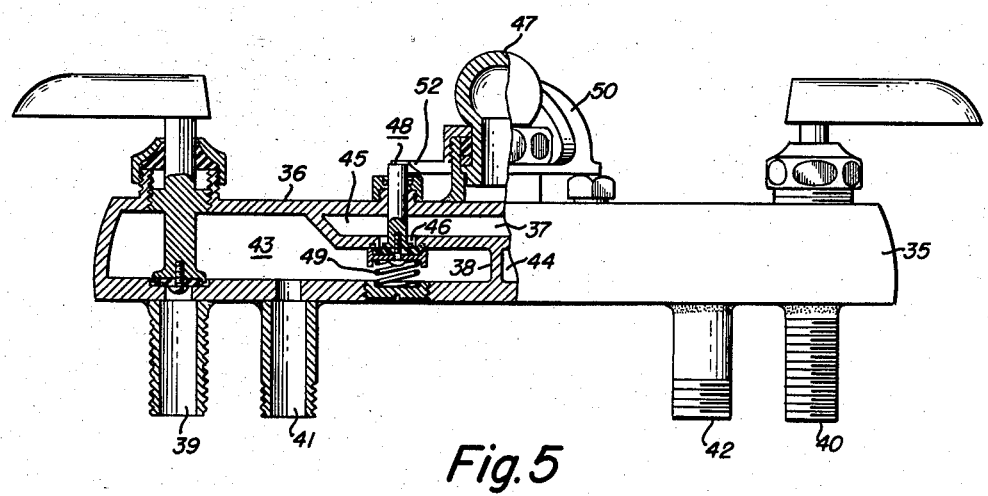
Figure 5 is a sectional view taken along line 5—5 of Figure 4.

In the Figures 4 and 5 of the drawings there is shown an alternate type of distribution faucet valve which will accomplish substantially the same results of providing the convenient location of all controls. In this modification, a chamber body 35 is defined by a wall casing 36 and the interior is divided into a hot water chamber 43, a cold water chamber 44, and a mixed water chamber 45 by means of walls 37 and 38 as illustrated in Figure 5.

Inlets 39 and 40 provide water from the source and outlets 41 and 42 carry the water to the automatic washing machine equipment. Openings 46, one of which is illustrated in the drawing, in wall 37 between chambers 43 and 45 are provided to supply hot and cold water into the mixing chamber 45. Valve devices 48 are adapted to reciprocate longitudinally to open and close the opening 46. A spring 49 urges the valve device 48 to a closed position.

A swing type spout 47 is supplied with water through openings from the chamber 45. There is no valve device between the chambers 45 and the spout 47. Rather, a cam cradle 50 having cams 51 and 52 is carried by the swing spout 47 and is adapted to contact the upper ends of the valve device 48 and force them open against the urging of spring 49 as the spout 47 is moved from the off position illustrated in Figure 4 to a front position. As the spout 47 swings to the front, the cams 51 and 52 depress the valves 48 and open the openings 46 to allow the water from chamber 43 and 44 to flow simultaneously into mixing chamber 45 and out through the spout 47. Again, the rate and distribution of hot and cold water is controlled by the conventional valve devices and the position of the spout 47 determines whether the water shall mix and be dispensed into the tub. Furthermore, the supply of water through outlets 41 and 42 to an automatic washer is controlled by the conventional faucet valve devices and the flow of water through the outlet spout 47 will have no appreciable effect upon such supply to the automatic washer except upon the pressure and such change in pressure will not effect the operation of the automatic washer except possibly to slow down the cycle slightly.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A distribution faucet valve assembly, comprising, a fluid mixing chamber, first and second valved service inlets into remote sections of said chamber, a manual control handle operably connected to the valve in each said inlet, a mixed fluid outlet from said chamber, said mixed fluid outlet including a housing having inner walls defining a vestibule, spout means from said vestibule, port means interconnecting said chamber and said vestibule, a divider wall separating said chamber into first and second sections associated with said first and second valved inlets respectively, a guide and drive spider threadably engaged to the said inner walls of the vestibule, means for manually rotating said spider from the exterior of said vestibule, rotation of said spider causing said spider to feed between a port opening and a port closing position, said divider wall having an opening therein aligned with said port means, said spider having port sealing means and a plug for closing said opening in the divider wall operable to close-off mixing through said opening and to shut off water outlet from said spout simultaneously, and first and second unvalved outlets associated with said first and second sections respectively.

References Cited in the file of this patent

UNITED STATES PATENTS

| | | |
|---|---|---|
| 1,601,979 | Norden | Oct. 5, 1926 |
| 1,790,625 | Kent | Jan. 27, 1931 |
| 1,853,154 | Snyder | Apr. 12, 1932 |
| 1,945,646 | Kumpman | Feb. 6, 1934 |
| 2,218,662 | Smith | Oct. 22, 1940 |
| 2,504,610 | Wolf | Apr. 18, 1950 |
| 2,810,395 | Simmons | Oct. 22, 1957 |